(12) United States Patent
Bogo et al.

(10) Patent No.: US 11,442,417 B2
(45) Date of Patent: Sep. 13, 2022

(54) CONTROL SYSTEM USING AUTOENCODER

(71) Applicant: Microsoft Technology Licensing, LLC, Redmond, WA (US)

(72) Inventors: Federica Bogo, Kilchberg (CH); Thomas Joseph Cashman, Cambridge (GB); Andrew William Fitzgibbon, Cambridge (GB); Luca Ballan, Redmond, WA (US); Jan Stuehmer, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 594 days.

(21) Appl. No.: 16/370,663

(22) Filed: Mar. 29, 2019

(65) Prior Publication Data

US 2020/0310370 A1 Oct. 1, 2020

(51) Int. Cl.
*G05B 15/02* (2006.01)
*G06N 3/08* (2006.01)
*G06T 17/00* (2006.01)

(52) U.S. Cl.
CPC .............. *G05B 15/02* (2013.01); *G06N 3/084* (2013.01); *G06N 3/088* (2013.01); *G06T 17/00* (2013.01)

(58) Field of Classification Search
CPC .. G05B 15/02; G05B 13/048; G05B 13/0265; G06N 3/084; G06N 3/088; G06T 17/00
See application file for complete search history.

(56) References Cited

U.S. PATENT DOCUMENTS

| | | | |
|---|---|---|---|
| 2018/0018451 A1 | 1/2018 | Spizhevoy et al. | |
| 2019/0135300 A1* | 5/2019 | Gonzalez Aguirre | G06N 20/00 |
| 2020/0017117 A1* | 1/2020 | Milton | G07C 5/008 |
| 2020/0082245 A1* | 3/2020 | Hao | G06N 3/084 |
| 2020/0097841 A1* | 3/2020 | Petousis | H03M 7/30 |
| 2020/0183046 A1* | 6/2020 | Wheelock | G01V 99/005 |
| 2020/0387798 A1* | 12/2020 | Hewage | G06N 3/08 |

FOREIGN PATENT DOCUMENTS

WO 2017156243 A1 9/2017

OTHER PUBLICATIONS

Chen, Nutan, "Efficient Movement Representation and Prediction with Machine Learning", In Doctoral Dissertation of Technical University of Munich, Feb. 8, 2018, 129 Pages.

Dosovitskiy, et al., "Generating Images with Perceptual Similarity Metrics based on Deep Networks", In Journal of Computing Research Repository, Feb. 2016, 14 Pages.

(Continued)

*Primary Examiner* — Mohammad K Islam (57) ABSTRACT

A control system comprises a memory storing a sequence of sensor data received from one or more sensors. The control system has a processor which processes the sensor data to compute a sequence of derived sensor data values. An autoencoder receives the sequence of derived sensor data values and computes a forward prediction of the sequence of derived sensor data values, the autoencoder having been trained imposing a relationship on positions of the derived sensor data values encoded in a latent space of the autoencoder. A processor initiates control of an apparatus using the forward prediction.

20 Claims, 8 Drawing Sheets

(56) References Cited

OTHER PUBLICATIONS

Sundermeyer, Martin, "Augmented Autoencoders for Object Orientation Estimation Trained on Synthetic RGB Images", In Doctoral Dissertation of Technical University of Munich, Sep. 2017, 80 Pages.

Trumble, et al., "Deep Autoencoder for Combined Human Pose Estimation and Body Model Upscaling", In Proceedings of 5th European Conference on Computer Vision, Sep. 8, 2018, pp. 1-17.

Yan, et al., "Skeleton-Aided Articulated Motion Generation", In Proceedings of 25th ACM International Conference on Multimedia, Oct. 23, 2017, pp. 199-207.

Park, et al., "A Multimodal Anomaly Detector for Robot-Assisted Feeding Using an LSTM-based Variational Autoencoder", In Journal of Computing Research Repository, Nov. 2, 2017, 8 Pages.

"International Search Report and Written Opinion Issued in PCT Application No. PCT/US20/017401", dated May 12, 2020, 11 Pages.

Zhang, et al., "SOLAR: Deep Structured Latent Representations for Model-Based Reinforcement Learning", In Journal of Computing Research Repository, Aug. 28, 2018, 15 Pages.

* cited by examiner

CONTROL SYSTEM USING AUTOENCODER

BACKGROUND

The present technology is concerned with control systems which operate to control apparatus in the light of sensor data or data derived from sensor data. Building heating control systems typically use one or more sensors to detect ambient temperature in a building and the sensor data, or data derived from the sensor data, is used to control the heating system in order to conserve energy whilst maintaining desired ambient building temperature. Robotic control systems also use sensor data such as images to control a robotic system as it moves in an environment. Sensors in a manufacturing plant detect information about performance of equipment and this is used by a control system in some cases to control and maintain the manufacturing plant in an automated manner.

In some cases, a human-computer interface acts to control a computer system using sensor data such as images and depth images, or data derived from the sensor data such as skeletal data derived from the images. In this way the skeletal data is used to control a computer to enable human body gestures of players of a game to control the computer. In some cases, an augmented reality computing device which is head worn is controlled by a control system in the light of sensor data such as images captured of one of more hands or a face of a user of the computing device.

The embodiments described below are not limited to implementations which solve any or all of the disadvantages of known control systems for controlling apparatus in the light of sensor data or data derived from sensor data.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A control system comprises a memory storing a sequence of sensor data received from one or more sensors. The control system has a processor which processes the sensor data to compute a sequence of derived sensor data values. An autoencoder receives the sequence of derived sensor data values and computes a forward prediction of the sequence of derived sensor data values, the autoencoder having been trained imposing a relationship on positions of the derived sensor data values encoded in a latent space of the autoencoder. The processor initiates control of an apparatus using the forward prediction.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Autoencoders, such as variational autoencoders and other types of autoencoder are well known in the field of machine learning. An autoencoder is a type of neural network comprising an encoder, which acts to compress data (using lossy compression), and a decoder which acts to reconstruct the data from the compressed data. Autoencoders are trained in an unsupervised manner and help with the task of representation learning because the representation into which the data is compressed by the encoder is learnt during the unsupervised training. The encoder often carries out dimensionality reduction. That is, the encoder compresses the input data from a large multi-dimensional input space, into a representation which has a reduced number of dimensions. The space into which the input data is encoded by the encoder is referred to as a latent space since it has characteristics which are learnt by the autoencoder.

In various examples described herein autoencoders are used in a control system to improve accuracy of predictions of a sequence of sensor data, or data derived from sensor data. Because the predictions are more accurate, the control system is able to control an apparatus more effectively and this leads to reduced use of resources, improved performance, improved robustness against failure and so on.

In some examples, autoencoders are used in a control system to improve the parameters of a parameterized model, where the parameterized model is used as part of a process to compute the sequence of data derived from sensor data. Selecting which parameters to use in a parameterized model is a difficult problem which is typically solved manually and as a consequence, is often non-optimal. Manual selection of which parameters to use often results in too many parameters being used so that the redundancy leads to inefficiency since computation takes longer than it should and is more complex and error-prone than it needs to be. However, finding principled ways of selecting which parameters to use is not straightforward. By using autoencoders to facilitate selection of which parameters to use in a parameterized model, significant improvements are possible.

The term "sequence" is used herein to refer to an ordered series of items where the items have a chronological order, and intervals between the items are irregular or regular.

A depth image is a two dimensional (2D) array where each entry comprises a distance value which is a distance from the camera to a surface in the scene depicted in the depth image. A point cloud is an array where each entry comprises a three dimensional (3D) coordinate of a surface point in the scene depicted in the image. A depth image is back-projected to compute a 3D point cloud using knowledge of the camera. In some examples a 3D point cloud is captured by a scanning sensor rather than by back projecting from a depth image.

The pose of an object comprises the global position and global orientation of the object and optionally the positions and orientations of one or more joints of the entity where the entity is articulated. The pose therefore has at least six degrees of freedom given by the global position and global orientation and has more than six degrees of freedom where positions and orientations of one or more joints are also included.

Figure 1:
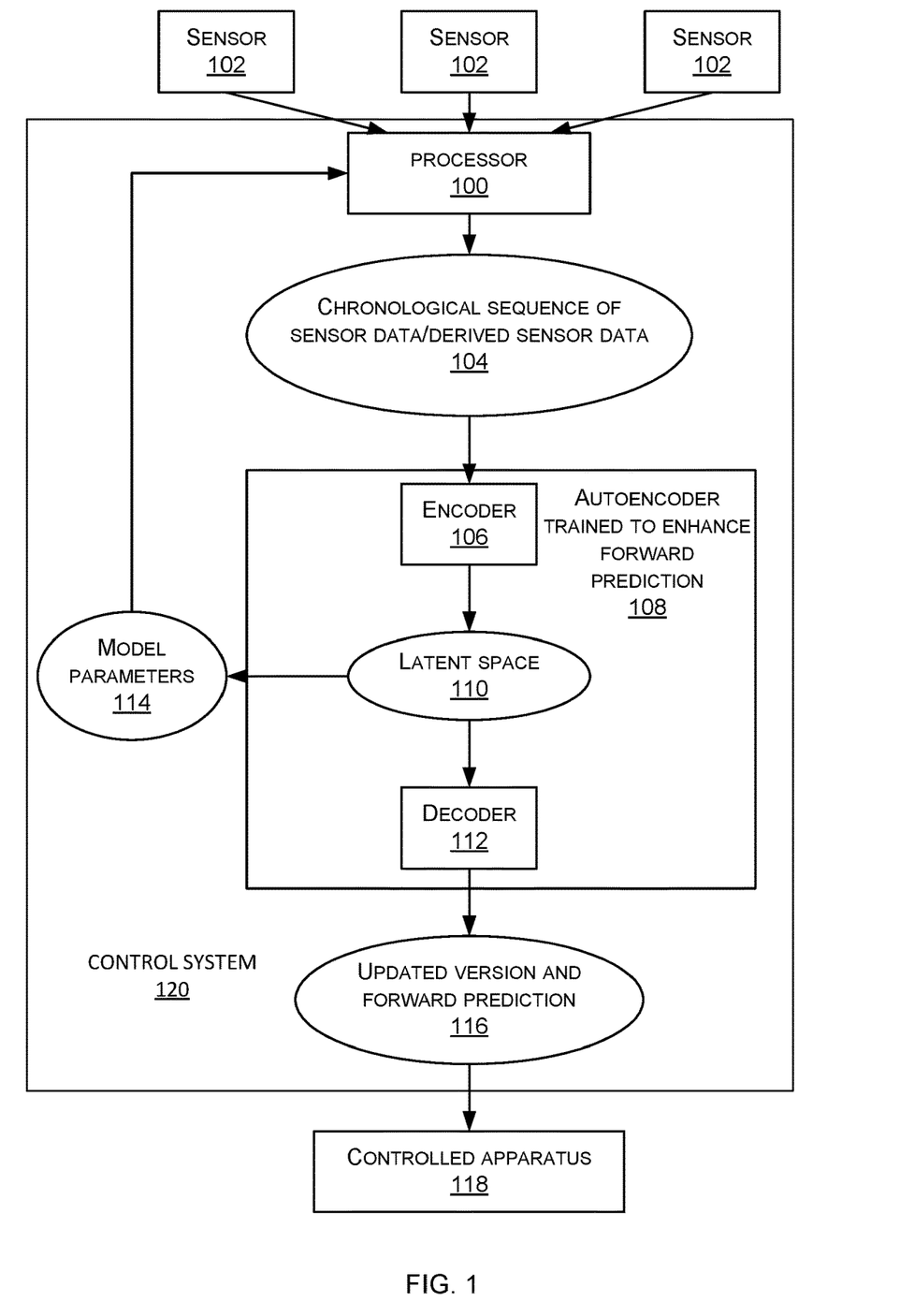
FIG. 1 is a schematic diagram of a control system having an autoencoder.

FIG. 1 is a schematic diagram of a control system 120 comprising at least a processor 100 and an autoencoder 108. The processor receives a sequence of sensor data from one or more sensors 102. The sensors are any type of capture device which measures, captures or senses data from its environment. A non-exhaustive list of examples of sensors is: depth camera, color camera, temperature sensor, pressure sensor, light sensor, accelerometer, global positioning system sensor, vibration sensor. In an example, the processor receives a sequence of sensor data in real-time as the data is sensed by the sensors and transmitted to the processor 100.

The processor 100 processes the received sensor data to generate a sequence 104 of derived sensor data. In an example, the processor 100 processes the received sensor data to compute an average of corresponding values from each of a plurality of sensors and outputs a sequence of the computed averages. In another example, the processor receives a stream of depth images depicting a person and it computes skeletal data representing the body position of the person. In this example, the processor outputs a sequence of the skeletal data.

The sequence 104 of derived sensor data is input to a trained autoencoder 108 which computes a forward prediction of the derived sensor data. The forward prediction is computed in a latent space of the autoencoder where the latent space of the autoencoder has been trained to enhance forward prediction of the sequence of derived sensor data as explained in more detail below.

The autoencoder comprises an encoder 106, a latent space 110 and a decoder 112. The encoder 106 and decoder 112 are implemented as a feedforward, non-recurrent neural network. Any suitable number of hidden layers is used in the neural network. In a non-limiting example, the autoencoder has a residual neural network architecture with residual connections, and leaky rectified linear units as the activation function (i.e. non linearity between layers). However, the choice of the architecture and non-linearities is not limiting and is different in other examples.

The latent space 110 is not a physical entity as such although a memory which stores the autoencoder 108 stores embeddings in the latent space of the input data which have been computed with the encoder 106.

The autoencoder 108 processes the sequence of derived sensor data 104 to provide an updated version 116 of that sequence and also to carry out forward prediction in the latent space. The forward prediction in the latent space yields one or more forward-predicted latent vectors which are decoded by the decoder 112 to produce forward-predicted values of the sequence of derived sensor data. In some cases, the updated version 116 is enhanced in terms of noise reduction as compared with the original sequence of derived sensor data 104.

The forward prediction 116 of the derived sensor data sequence is used to initiate control of a controlled apparatus 118 according to the particular application domain. In an example the sensors 102 are temperature sensors in a building and the controlled apparatus is a central heating apparatus of the building. The forward prediction of the derived sensor data sequence and optionally the accurate updated version 116 of the derived sensor data sequence is used to initiate control of the central heating apparatus. This enables as the control system 120 to save energy whilst having the building at a correct ambient temperature at appropriate times. In an example the sensors 102 are sensors in machinery of a manufacturing plant. The forward prediction of the derived sensor data sequence and optionally the accurate updated version 116 of the derived sensor data sequence is used to initiate control of the machinery so as to control the manufacturing plant in an optimal manner.

In some examples, the dimensions of the latent space which have been learnt during training of the autoencoder 108 are taken and used as model parameters 114 of a model used by the processor 100. This is explained in more detail with reference to FIG. 1A below.

In some examples the control system 120 is implemented in a single computing device such as a wearable computer, a smart phone, an augmented-reality head-worn computing device or other computing device.

In some examples the control system 120 is deployed as a cloud service whereby sensor data from sensors 102 is sent to the control system 120 in the cloud and the control system 120 in the cloud sends the updated version and forward prediction 116 to the controlled apparatus 118.

Hybrids between the previous two cases are deployed in some examples whereby some but not all of the control system functionality is in the cloud.

Figure 1A:
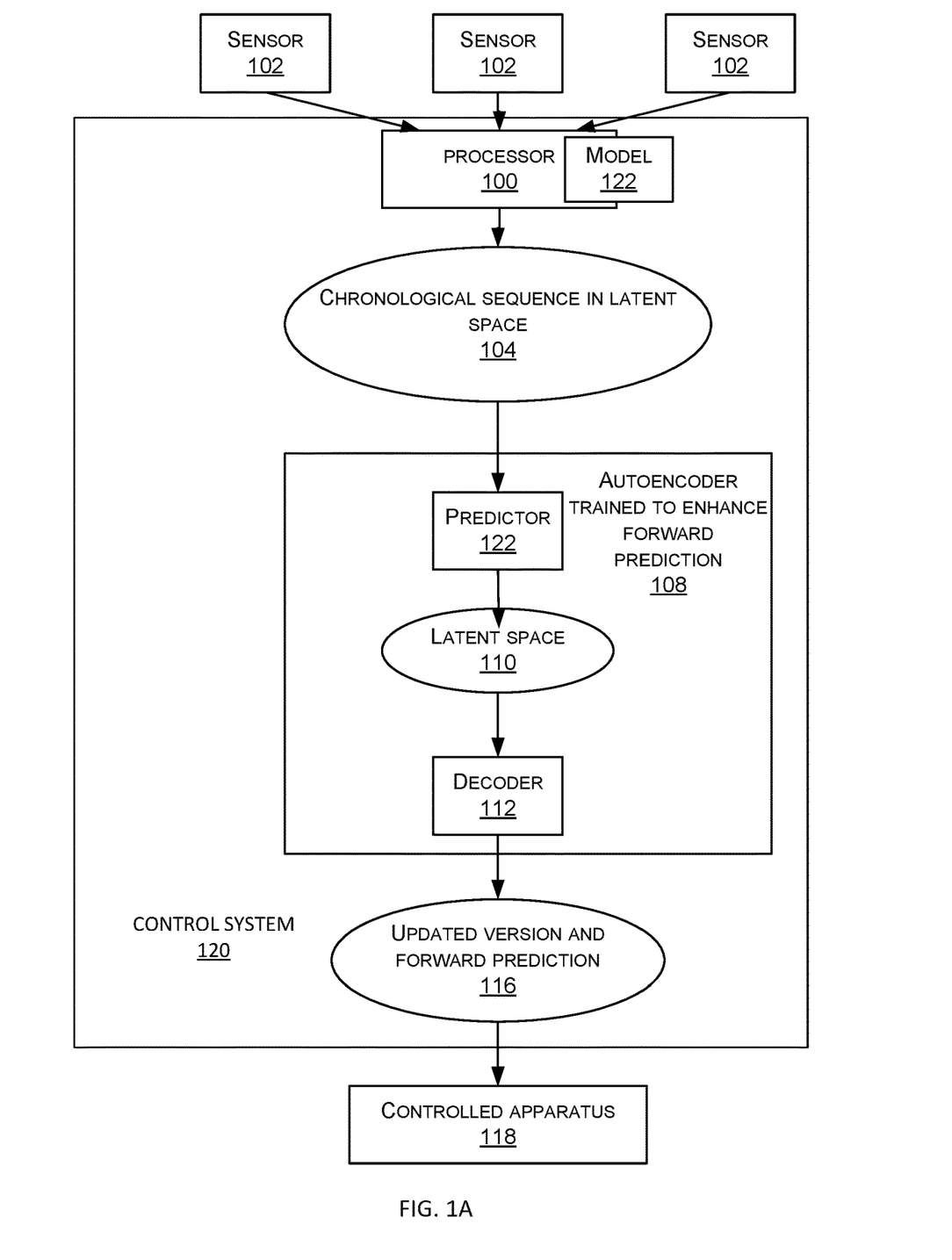
FIG. 1A is a schematic diagram of another example control system.

FIG. 1A shows the control system of FIG. 1 but with the encoder omitted. In the example of FIG. 1A the dimensions of the latent space which have been learnt are taken and used in a model 122 by the processor. The processor 100 uses the model to generate a sequence of derived sensor data from the sensor data it receives. The sequence of derived sensor data that the processor computes is already in the latent space 110 since the processor 100 computes output values in the dimensions of the model which are the same as those of the latent space. The output of the processor 100 is a chronological sequence 104 in latent space. A predictor 122 receives the sequence 104 and computes a forward prediction of the sequence 104 in the latent space. Because of the way the latent space has been formed during training of the autoencoder, the forward prediction takes into account a relationship in the latent space which was part of one or more error terms in a training objective of the latent space. The forward prediction of the sequence 104 in latent space is decoded by the decoder 112 to give a forward prediction of the sequence of derived sensor data values. In some cases the decoded also decodes values which are an updated version of the sequence of derived sensor data values 104, for example, having reduced noise.

The use of the trained autoencoder as part of the control system enables the control system to operate in an unconventional manner to achieve more efficient and accurate control.

The trained autoencoder, trained such that the latent space of the autoencoder facilitates forward prediction of a sequence of sensor data, or data derived from sensor data, improves the functioning of the underlying control system.

In some examples, the functionality of the control system of FIG. 1 is performed, at least in part, by one or more hardware logic components. For example, and without limitation, illustrative types of hardware logic components that are used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
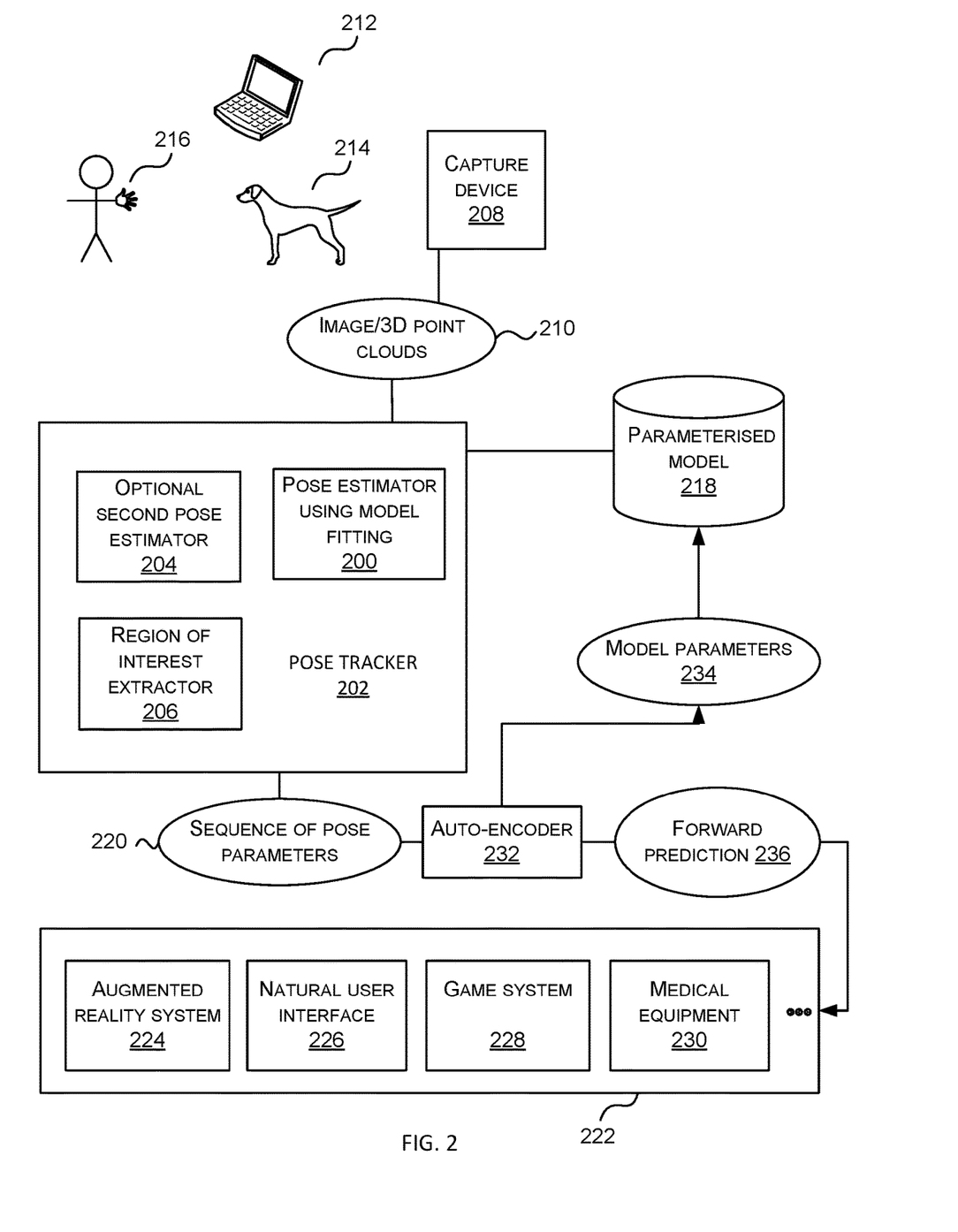
FIG. 2 is a schematic diagram of a control system which is a pose tracker, and where the control system has an autoencoder.

FIG. 2 is a schematic diagram of a control system which is a pose tracker 202, and where the control system has an autoencoder 232. The pose tracker 202 derives a sequence of values of pose parameters of a 3D object by computing a sequence of values of the pose parameters from captured sensor data. The pose parameters comprise a global location and global orientation of the object and optionally positions of one or more joints of the object. The global location and global orientation comprise six degrees of freedom so that there are at least 6 parameters whose values are to be computed.

A capture device 208 such as a color camera, depth camera, a sensor which captures three dimensional (3D) point clouds, or other type of sensor captures data depicting the object in an environment. In the example of FIG. 2 the object is shown as a human hand 216, a laptop computer 212, or a dog 214 but any other object may be used. The object is articulated in some examples, and in other examples it is not articulated. The captured data 210 such as an image or 3D point cloud is input to the apparatus 202 using a wired or wireless link, over a communications network or in other ways.

The pose tracker 202 is computer implemented for example in a mobile phone, in a personal computer, in a head worn augmented reality computing device, in a game system, in medical equipment or in other apparatus depending on the application domain concerned. The pose tracker 202 has access, over a wired or wireless communications link over a network, or from a memory at the pose tracker itself, to a store holding a parameterized model 218 of the object. For example, the model 218 is stored at the mobile phone, medical equipment, game system or other device. The model 218 is stored at a remote location accessible to the apparatus 202 over a communications network, in some examples. The pose tracker 202 has an input such as a wireless receiver, a wired communications port or other input to a computing device, which receives captured sensor data from the capture device 208. The capture device 208 sends the captured sensor data to the pose tracker 202 over a network in some examples. The apparatus receives captured sensor data from more than one capture device in some examples. The sensor data 210 received at the apparatus is stored in a memory of the apparatus such as the memory described later in this document.

The model 218 is a model of a class of 3D objects such as human hands, human bodies, or coffee mugs. The apparatus is configured to detect pose of objects in the class of 3D objects of the model.

The pose tracker computes a sequence of derived sensor data which in this case is a sequence of values of pose parameters 220 of the model 218 which fit the captured data 210. In the present technology the apparatus computes a stream of values of the pose parameters 220 as a stream of captured data 210 is input to the pose tracker 202. In this way the pose tracker 202 follows pose of the articulated object as it moves and/or as the capture device 208 moves.

The sequence of pose parameters 220 is input to an autoencoder 232. The autoencoder is a neural network as described above with reference to FIG. 1. The autoencoder has been trained to enhance forward prediction of the sequence of pose parameter values, by training the autoencoder according to a motion model where the motion model is defined in the latent space of the autoencoder. The motion model is linear or non-linear. The autoencoder 232 outputs a forward prediction 236 of the sequence of pose parameter values.

The forward prediction 236 of the pose parameter values 220 are input to one or more downstream apparatus 222 such as an augmented reality system 224, a natural user interface 226, a game system 228, medical equipment 230 or others. In the case of an augmented reality system or a robotic system, the updated values of the pose parameters are used to enable an apparatus to interact with the object. In the case of a natural user interface the updated values of the parameters are used to enable the object to interact with a computing device, such as where the object is a human body or human hand which is used to make gestures and control a computer.

The pose tracker itself comprises a pose estimator which uses model fitting 100, an optional second pose estimator 104 using another type of technology, and optionally a region of interest extractor 106. The example of FIG. 2 is extended in some examples, by detecting values of other parameters of the 3D object, such as shape parameters of the 3D object, in addition to values of pose parameters.

In some examples, the functionality of the pose tracker 202 is performed, at least in part, by one or more hardware logic components. For example, and without limitation, illustrative types of hardware logic components that are used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

In some examples, model parameters 234 are found from the latent space of the autoencoder 232 and used as the model parameters of the parameterized model 218 as explained earlier with reference to FIG. 1A In an example, the parameterized model 218 is a generative model of the human body or its parts, like hands or faces, and is used to fit noisy, incomplete data captured with depth and/or RGB sensors in order to track hands or body of a person depicted in the captured data. In this example the generative model is parameterized by a plurality of shape and/or pose parameters as well as one or more joint angles. However, it is recognized herein that manually specified joint-angle representations are not optimal for a variety of reasons.

Joint-angle representations are often over-parameterized because there exist correlations between different joint angles, which are not modelled. For real-time applications, keeping the number of parameters low is crucial since it improves efficiency and makes real-time operation practical to achieve for resource constrained devices such as wearable computers and smart phones.

Where joint-angle representations are used as part of the parameterized model 218 there are inefficiencies at fitting time, when the model is fitted to the captured data. The inefficiency arises at least in part because at fitting time, priors are manually introduced to constrain the set of plausible values for the joint-angle parameters (for example, to ensure that joint-angles which are physically impossible for a human hand or human body are avoided). Physically plausible joint angles lie within defined ranges. However, manually introduced priors are often inaccurate as compared with data-driven priors By using the autoencoder 232 the present technology is able to learn expressive representations for the parameterized model 218. As a result there is improved efficiency because over-parameterization is reduced. As a result there is improved performance at test time when the control system is in use, because there is no prior to be taken into account during the model fitting, or a simpler prior to be taken into account during the model fitting. The "prior" information is instead captured as part of the learnt latent space of the autoencoder which is learnt during training of the autoencoder as now explained with reference to FIG. 3.

Figure 3:
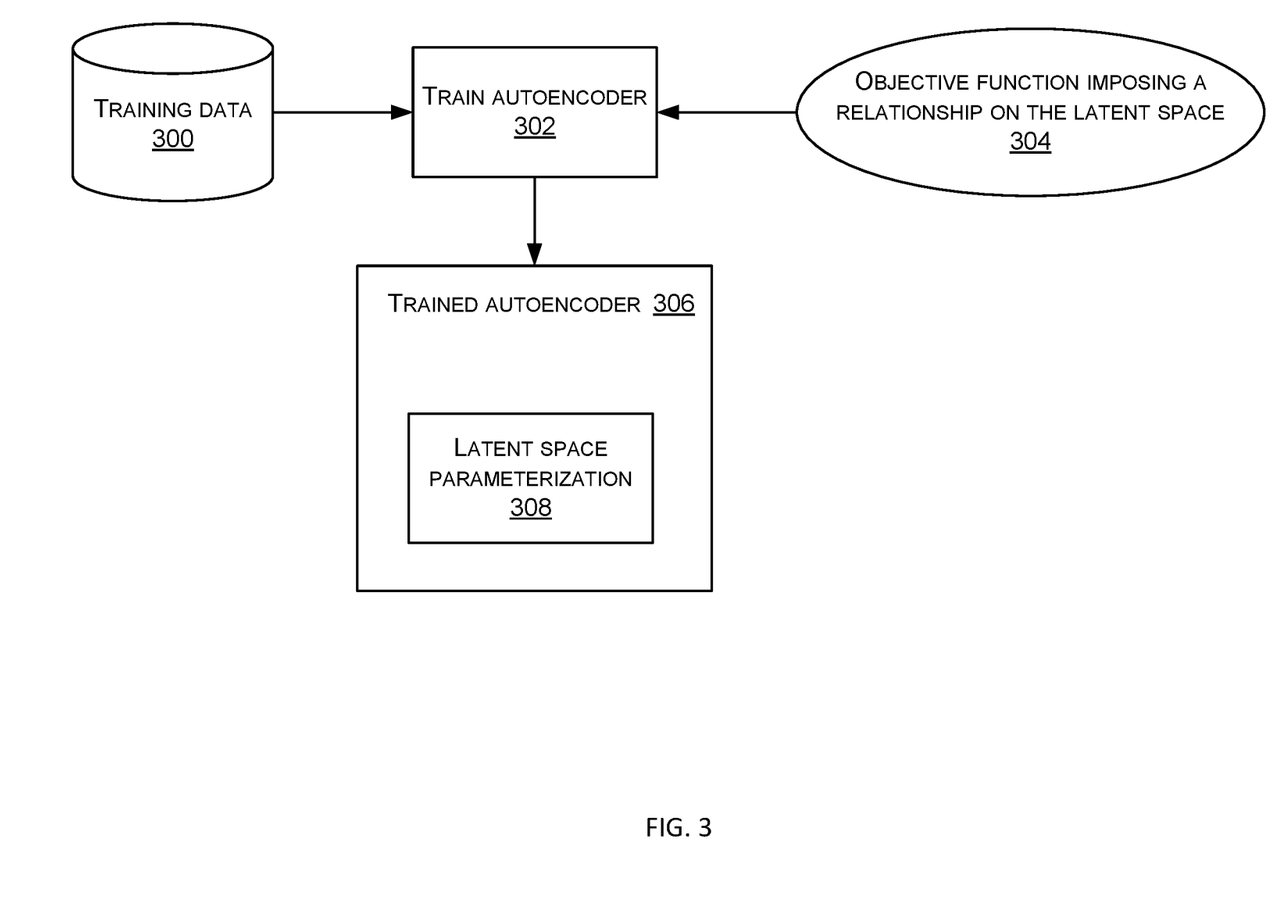
FIG. 3 is a schematic diagram of a method of training an autoencoder for use in a control system.

FIG. 3 shows a store of training data 300 to be used for training 302 the autoencoder such as the autoencoder of FIGS. 1 and 2. The training data comprises historic sequences of derived sensor data. The particular type of derived sensor data depends on the particular apparatus that the control system is to control. The training data 300 is used in an unsupervised training process to train 302 the autoencoder as now explained.

An item of training data is obtained from the store 300 and comprises an input vector. An untrained autoencoder is obtained comprising an encoder neural network and a decoder neural network connected in series and where the weights of the neural networks are initialized at random or in any other way. The input vector, x (which is an item from the sequence of sensor data or derived sensor data), is encoded using the encoder E into a latent vector z: $z=E(x)$ by processing the input vector in a feed forward pass through the encoder neural network. The resulting latent vector is input to the decoder neural network and processed in a feed forward pass through the decoder neural network to compute an estimate x' of the input vector by decoding z: $x'=D(z)$. Thus an encoder function $E(x)$ is computed using the encoder neural network and a decoder function $D(z)$ is computed using the decoder neural network. The error or difference between the input vector x and the output vector x' is computed and the error is backpropagated through both the decoder and encoder neural networks in a process whereby the weights of the neural network are updated. In an example the error is computed as an L2 norm which is the square of the magnitude of the difference between the input and output vectors. However, this example is not intended to be limiting as other measures of the error are used in other examples. Any standard, well-known, backpropagation algorithm is used which is suitable for autoencoders, such as a conjugate gradient method, steepest descent, or a process using pre-training whereby the initial weights of the neural networks approximate the final solution rather than being randomly initialized. The training process thus follows an objective function 304 which in the example discussed above is a function which minimizes the difference between the input and output vectors. The forward pass and backpropagation process is carried out once for each item of training data to produce a trained autoencoder 306 having a latent space parameterization 308.

The present technology uses an extension to the objective function 304 whereby a relationship between positions of the embedded input vectors in latent space is promoted, in order to facilitate forward prediction of the sequence of derived sensor data values. In an example, the relationship is a motion model which describes motion of the sequence of embedded input vectors in the latent space. A non-exhaustive list of example motion models is: a velocity, a constant velocity, an acceleration, a constant acceleration. The training objective 304 of the autoencoder 306 is extended beyond minimization of the error between the input and output vectors, to include at least one error term which is related to the latent space. The additional error term(s) enable the learned latent space to be structured to facilitate forward prediction of the sequence of derived sensor data values.

In order to add the extension to the objective function 304 the training process is adapted to consider sequences of input vectors rather than single instances. In contrast, previous autoencoder training schemes have used single instances of input vectors and have deliberately randomized the order of the input vector training instances. In the present technology, the prejudice of previous approaches is overcome since training is carried out using chronological sequences of three or more input vectors.

In an example, the motion model is a constant velocity in latent space. To encourage the latent space adhere to the motion model an error term is added to the standard autoencoder training objective as follows. Given three consecutive input vectors from the sequence of derived sensor data values $x_1$, $x_2$ and $x_3$ and their encodings $z_1=E(x_1)$, $z_2=E(x_2)$ and $z_3=E(x_3)$, the following error term is specified:

$$L_v=\|2z_2-z_1-z_3\|^2$$

Which is expressed in words as the velocity loss $L_v$ is equal to the norm of double the embedding of the second input vector minus the embeddings of the first and third input vectors. The error is computed over all the triplets of consecutive input vectors in the training set. In this example triplets of consecutive input vectors are used but this example is not intended to be limiting as some examples use more than three consecutive input vectors.

Note that a trivial solution to minimize the velocity loss $L_v$ would be to set z values to 0. To prevent this, an error term is added to the objective function encouraging latent variables to have identity covariance. Other ways of avoiding the trivial solution are also possible. In some examples, other error terms are added to the objective function to regularize the latent space.

An example objective function is now given where using error terms previously introduced in this document. In the example the objective function is given as:

$$L_{REC}+a\ L_v+bL_{REG}$$

Which is expressed in words as, an objective function used to train the autoencoder is the minimum of the sum of the reconstruction loss $L_{REC}$, plus a weight a times the velocity loss $L_{REC}$, plus a weight b times the regularization loss $L_{REG}$. In an example, the reconstruction loss is given as $$L_{REC}=\|x-x'\|^2$$

Where $\|x-x'\|^2$ is the squared Euclidean norm of the input x and output x' of the autoencoder. The velocity loss $L_v$ is computed as an error over a plurality of input vectors.

By including in the objective function one or more error terms in latent space a number of benefits are achieved. The latent space itself is learnt in a manner such that its structure is generally smooth and a smooth latent space makes optimization easier so that the trained autoencoder is more efficient to use at test time (after training and when the autoencoder is used to control an apparatus). Since motion models are already defined and introduced at training time, they do not need to be arbitrarily added from the outside during model fitting (simplifying, in this way, the objective minimized at fitting time) in the case where model fitting is part of the process of deriving the sequence of derived sensor data values. Learned trajectories in latent space represent plausible motions in the real world; this makes the learned latent variables more effective than manually defined parameters of a parameterized model used as part of the process of deriving the sequence of derived sensor data values.

Figure 4:
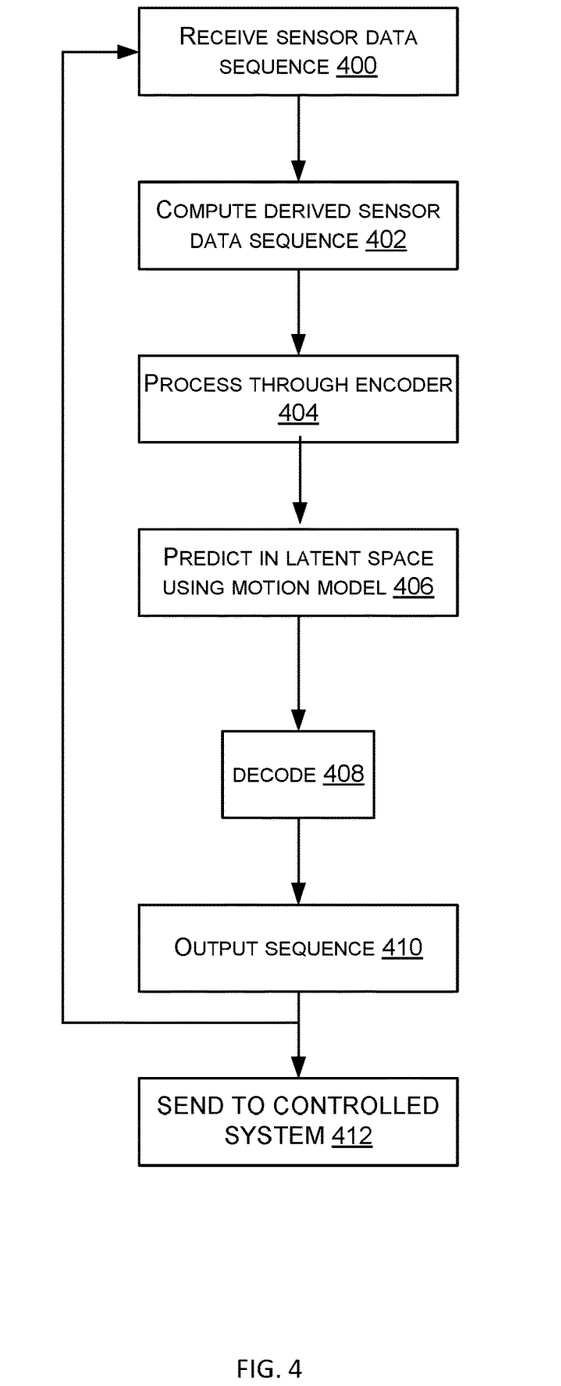
FIG. 4 is a flow diagram of a method of operation performed by the control system of FIG. 1.

FIG. 4 is a flow diagram of a method performed at the control system of FIG. 1. A sensor data sequence is received 400 and the processor is used to compute 402 a derived sensor data sequence. The derived sensor data sequence is input to the trained autoencoder and processed through the encoder 404 to compute a sequence of embeddings in latent space. A forward prediction of the sequence of embeddings in latent space is computed by predicting 406 in the latent space using a motion model. Because the autoencoder has been trained to have a latent space which facilitates forward prediction according to the motion model, the prediction is highly accurate. The predicted value(s) in the latent space are decoded 408 by the decoder to produce an output sequence 410. The output sequence 410 is then sent to the controlled system 412. The method of FIG. 4 repeats as indicated in FIG. 4.

Figure 5:
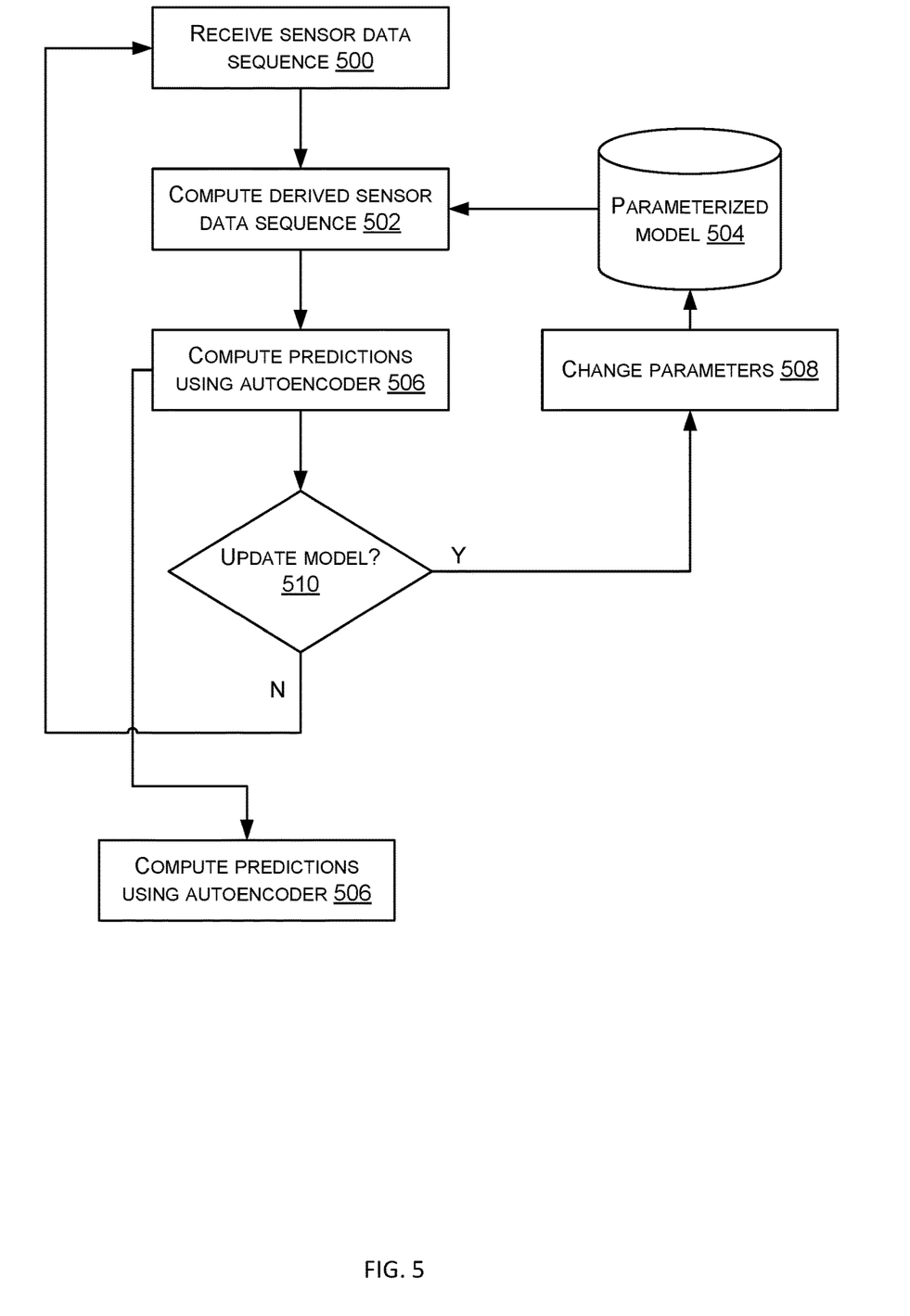
FIG. 5 is a flow diagram of another method of operation performed by the control system of FIG. 1.

FIG. 5 is a flow diagram of another method performed at the control system of FIG. 1. A sensor data sequence is received 500 and the processor is used to compute 502 a derived sensor data sequence. A parameterized model 504 is used by the processor when it computes 502 the derived sensor data sequence.

The derived sensor data sequence is input to the trained autoencoder to compute 506 predictions. The output sequence from the autoencoder is sent 512 to a controlled apparatus to initiate control of the controlled apparatus.

A decision 510 is taken as to whether or not to update the parameterized model. The decision is taken automatically based on one or more factors such as feedback about how well the apparatus is being controlled, the number of parameters of the latent space being less than the number of parameters of the parameterized model 504, the type of parameters of the latent space being different from the parameters of the parameterized model 504. When the decision at check 510 is to update the parameterized model then a change 508 is made to the parameterized model 504. The method of FIG. 5 then repeats using the changed parameterized model 504.

Figure 6:
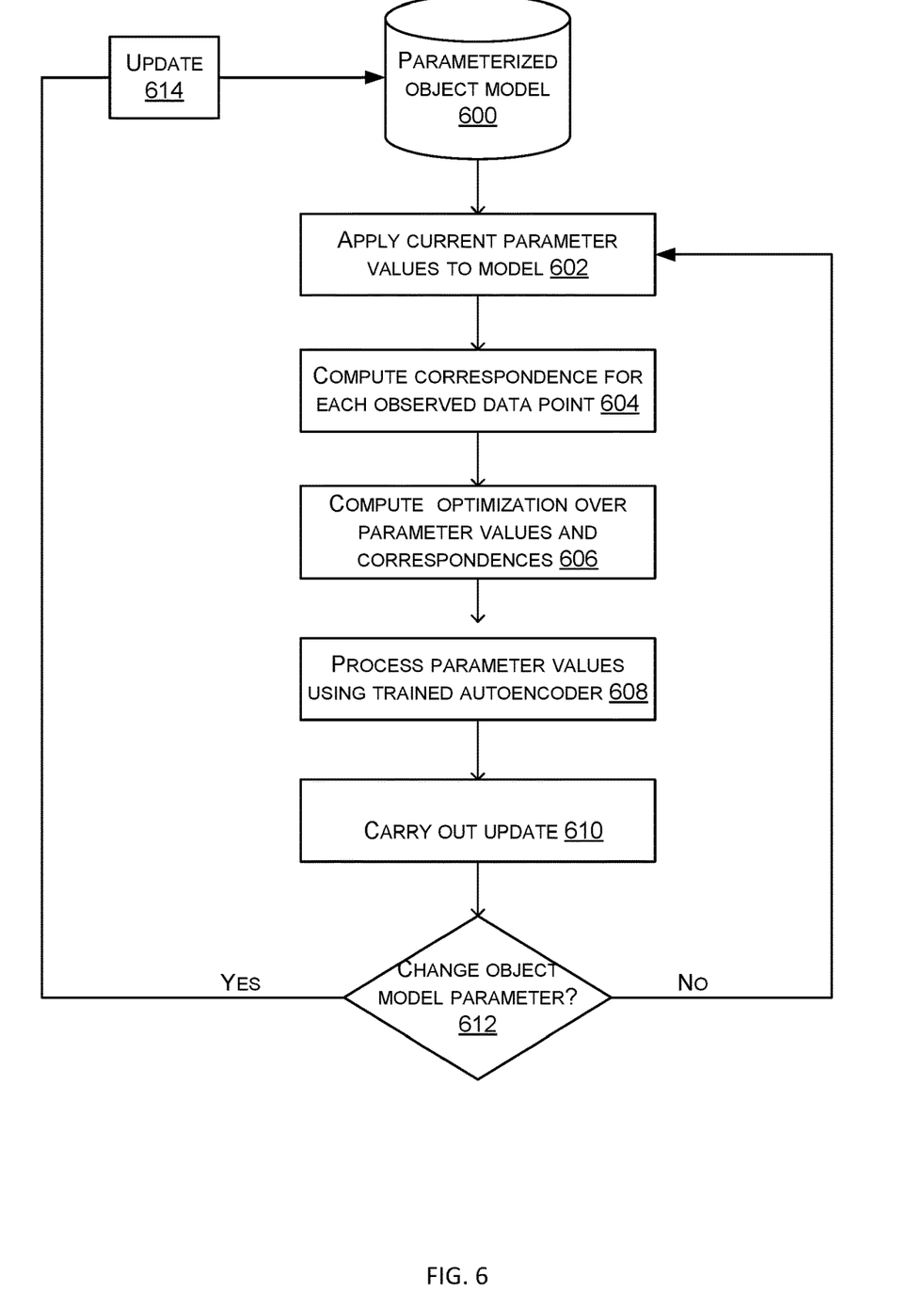
FIG. 6 is a flow diagram of a method of operation performed by the control system of FIG. 2.

FIG. 6 is a flow diagram of a method performed at the control system of FIG. 2. The pose tracker 202 accesses 600 a parameterized model of the object such as a polygon mesh model of the object. For example, in the case that the aim is to track a coffee mug the apparatus accesses a polygon mesh model of a generic coffee mug.

The pose tracker 202 receives captured data depicting the object to be tracked. For example, the captured data is a 3D point cloud, a depth map, one or more frames of raw time of flight data, color image data or other captured data depicting the object to be tracked. Optionally a region of interest is extracted from the captured data where the region of interest depicts the object to be tracked rather than other parts of the scene or environment in which the object is present. For example, the pose tracker 202 uses machine learning technology or image analysis to extract a region of interest of the captured data depicting the object to be tracked. The region of interest may or may not be contiguous.

In some examples, where the region of interest comprises parts of a depth map, the pose tracker 202 computes a 3D point cloud by back projecting the region of interest. In some cases a 3D point cloud is already available. In some cases no 3D point cloud is used.

The pose tracker 202 applies 602 current values of the model parameters to the model. The current values of the model parameters are the values computed for a previous instance of the captured data. If there are no previous instances of captured data then the values are initialized to random values or are manually set or are estimated using machine learning techniques.

The pose tracker 202 computes 604 a correspondence for each of a plurality of the observed data points in the captured data. In this example, a correspondence is a tuple of values denoted by the symbol u, which specifies a point on a surface of the polygon mesh model. A defining function S is stored at the pose tracker 202 and is a function which takes as its input a correspondence u and the pose parameters θ. The defining function S computes a 3D position in the world that point u on the polygon mesh surface corresponds to. In an example, polygon indices of the polygon mesh are stored on disk, and the defining function S which is implemented in code, is also stored on disk. The defining function S uses the polygon indices alongside the mesh posing implementation to evaluate the surface by interpolating between the vertices given by the polygon indices. In this way the defining function S is used, together with knowledge of a capture device used to capture the sensor data, to compute the correspondences. Where initial values of the correspondences are already known the initial values are used to influence or simplify the computation of the correspondences at operation 604.

Once the correspondences have been computed the pose tracker 202 computes an optimization 606 jointly over the parameter values of the model and the correspondences. In an example the optimization computes a minimization of the following objective function:

$$\min_{\theta, u_1, \ldots u_n} \sum_{i=1}^{n} \psi(\|x_i - S(u_i; \theta)\|) + \psi^{\perp}(\|x_i^{\perp} - S^{\perp}(u_i; \theta)\|)$$

Which is expressed in words as a minimum over the pose parameters θ and n values of the correspondences u of the sum of a robust kernel ψ(.) applied to the magnitude of the difference between a 3D point cloud point $x_i$ and a corresponding 3D surface point $S(u_i; \theta)$, and a different robust kernel $\psi^{\perp}(.)$ applied to the magnitude of the difference between a 3D point cloud normal $x_i^{\perp}$ and a corresponding 3D surface normal $S^{\perp}(u_i; \theta)$. The 3D surface point in this equation lies on a polygon mesh, while the 3D surface normal is an approximation to the geometric normal of a smooth surface such as a subdivision surface. The robust kernels ψ(.) and $\psi^{\perp}(.)$ are a Geman-McClure kernel, a Huber kernel, a Quadratic kernel or other kernel. In examples where other parameters of the 3D object are detected (such as shape parameters), these parameters may be included in the objective function such as the objective function above.

The result of the optimization 606 comprises updates to be added to the parameter values of the model, and updates to be applied to the correspondences.

The updates to be added to the parameter values of the model are processed using the trained autoencoder at operation 608 and at least one forward prediction is computed in the latent space of the autoencoder.

The pose tracker 202 carries out 610 the update to the parameter values of the model by adding the update computed by the optimization to the current values of the model parameters. The pose tracker 202 carries out the update to the correspondences by walking the correspondences along the surface of the polygon mesh by an amount and in a direction specified by the optimization results.

The updated parameter values are used at operation 602 as the process of FIG. 6 repeats as indicated in FIG. 6.

A check is made at check point 612 as to whether or not to change the object model parameters. The decision is automated and depends on one or more factors such as current performance of the control system, a confidence level of an output of the autoencoder, a difference in the number of parameters of a latent space of the autoencoder and the number of parameters of the object model 600, a difference in the type of parameters of the latent space of the autoencoder and the parameters of the object model 600. If the object model parameters are to be changed then update operation 614 is executed; otherwise the method repeats from operation 602.

Figure 7:
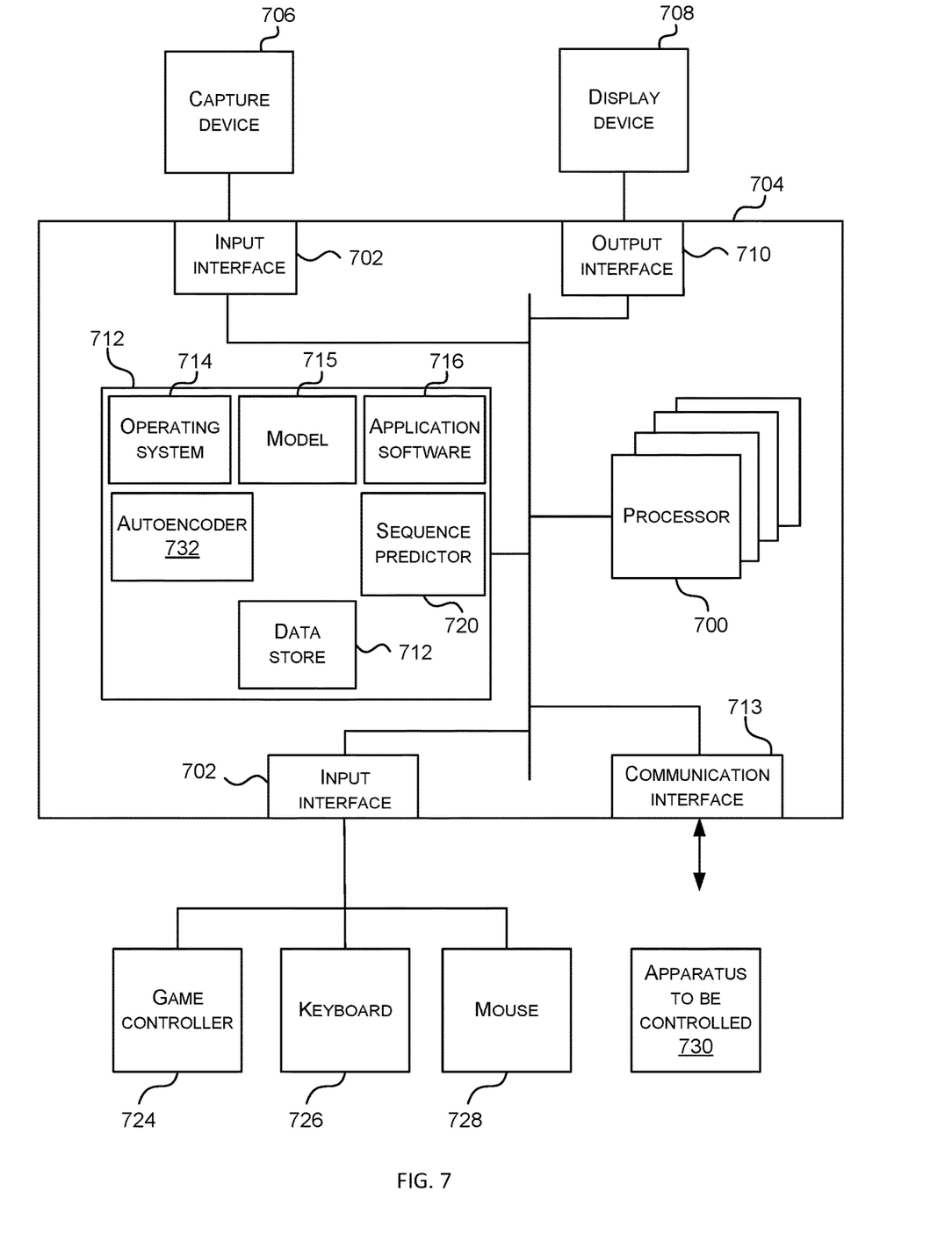
FIG. 7 illustrates an exemplary computing-based device in which embodiments of a control system with an autoencoder are implemented.

FIG. 7 illustrates various components of an exemplary computing-based device 704 which may be implemented as any form of a computing and/or electronic device, and in which embodiments of a control system with an autoencoder 732 may be implemented.

Computing-based device 704 comprises one or more processors 700 which may be microprocessors, controllers, graphics processing units, parallel processing units, or any other suitable type of processors for processing computing executable instructions to control the operation of the device in order to control an apparatus. In some examples, for example where a system on a chip architecture is used, the processors 700 may include one or more fixed function blocks (also referred to as accelerators) which implement a part of the method of controlling an apparatus in hardware (rather than software or firmware).

The computing-based device 704 comprises one or more input interfaces 702 arranged to receive and process input from one or more devices, such as user input devices (e.g. capture device 706, a game controller 724, a keyboard 726 and/or a mouse 728). This user input may be used to control software applications or games executed on the computing device 704. The capture device 706 captures sensor data.

The computing-based device 704 also comprises an output interface 710 arranged to output display information to a display device 708 which can be separate from or integral to the computing device 704. The display information may provide a graphical user interface. In an example, the display device 708 may also act as the user input device if it is a touch sensitive display device. The output interface may also output data to devices other than the display device, e.g. a locally connected printing device.

The computer executable instructions may be provided using any computer-readable media that is accessible by computing based device 704. Computer-readable media may include, for example, computer storage media such as memory 712 and communications media. Computer storage media, such as memory 712, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Although the computer storage media 712 (memory) is shown within the computing-based device 704 it will be appreciated that the storage may be distributed or located remotely and accessed via a network or other communication link (e.g. using communication interface 713).

Platform software comprising an operating system 714 or any other suitable platform software may be provided at the computing device 704 to enable application software 716 to be executed on the device. A data store 722 is provided to store data such as parameter values, correspondences, captured sensor data and other data. A model 715 is a parameterized model of an object. An autoencoder 732 is provided as described herein and a processor 720 is available to compute a sequence of derived sensor data values from a sequence of sensor data values received at the input interface 702.

FIG. 7 also shows the apparatus to be controlled 730 which receives communication from the computing-based device 704 via communication interface 713.

Alternatively or in addition to the other examples described herein, examples include any combination of the following:

Clause A. A control system comprising:
  a memory storing a sequence of sensor data received from one or more sensors;
  one or more processors which processes the sensor data to compute a sequence of derived sensor data values;
  an autoencoder configured to receive the sequence of derived sensor data values and compute a forward prediction of the sequence of derived sensor data values, the autoencoder having been trained imposing a relationship on positions of the derived sensor data values encoded in a latent space of the autoencoder;
  at least one of the processors being configured to initiate control of an apparatus using the forward prediction. By making predictions in the latent space, and where the latent space has been learnt during training of the autoencoder, improved accuracy of prediction is achieved and hence better control.

Clause B The control system of clause A wherein the relationship comprises a motion model. Using a motion model is found to be an effective and simple way to appropriately train the autoencoder.

Clause C The control system of any preceding clause wherein the relationship comprises a velocity. Where the motion model is a velocity improved prediction is found.

Clause D The control system of any preceding clause wherein the relationship comprises a constant velocity. Where the motion model is a constant velocity there is improved prediction without undue computational burden since the motion model is simple.

Clause E The control system of clause A or clause B wherein the relationship comprises an acceleration. Where the motion model is an acceleration there is improved prediction without undue computational burden since the motion model is simple.

Clause F The control system of any preceding clause wherein the processor uses a parameterized generative model of the derived sensor data values, and wherein the parameters of the generative model are related to parameters of the derived sensor data values when encoded in the latent space. In this way there is improved control since the generative model is improved.

Clause G The control system of clause F wherein the parameters of the generative model are selected to correspond with parameters of the derived sensor data values when encoded in the latent space. In this way there is improved control since the generative model is improved.

Clause H The control system of any preceding clause wherein the autoencoder has been trained using an objective function having at least one error term defined in the latent space. In this way there is improved control since prediction in the latent space is more accurate.

Clause I The control system of any preceding clause wherein the autoencoder has been trained using an objective function having an error term encouraging latent variables to have identity covariance.

Clause J The control system of any preceding clause wherein the sequence of derived sensor data values comprises at least three consecutive values x1, x2, x3, and wherein the autoencoder has been trained using an objective function which comprises an error term which is related to a motion model of the at least three consecutive values in the latent space. Using at least three consecutive values and an error term related to a motion model gives enhanced accuracy without undue increased computation burden.

Clause K The control system of any preceding clause wherein the objective function penalizes differences between inputs to the encoder and corresponding outputs of the decoder, and where the error term which is related the a motion model is computed as a norm of the at least three consecutive values in the latent space. The error term is thus simple and efficient to compute.

Clause L A computer-implemented method comprising: receiving a sequence of derived sensor data values computed from a sequence of sensor data received from one or more sensors; using an autoencoder to process the sequence of derived sensor data values and compute a forward prediction of the sequence of derived sensor data values, the autoencoder having been trained imposing a relationship on positions of the derived sensor data values encoded in a latent space of the autoencoder.

Clause M The method of clause L comprising training the autoencoder using an objective function having an error term defined in the latent space.

Clause N The method of clause L or clause M comprising training the autoencoder using an objective function having an error term encouraging latent variables to have identity covariance.

Clause O The method of any of clauses L to N wherein the sequence of derived sensor data values comprises at least three consecutive values x1, x2, x3, and wherein the method comprises training the autoencoder using an objective function which penalizes differences between inputs to the encoder and corresponding outputs of the decoder, and which comprises an error term which is the square of double the encoding of x2 in the latent space, minus the encoding of x1 in the latent space, minus the encoding of x3 in the latent space.

Clause P A control system comprising:
a memory storing a sequence of sensor data received from one or more sensors, the sensor data depicting an object;
a pose detector which processes the sensor data to compute a sequence of values of pose parameters of the object by fitting a parameterized model to the sensor data;
an autoencoder configured to receive the sequence of pose parameter values and compute a forward prediction of the sequence of pose parameter values, the autoencoder having been trained imposing a relationship on positions of the pose parameter values encoded in a latent space of the autoencoder;
a processor configured to initiate control of an apparatus using the forward prediction.

Clause Q The control system of clause P wherein the parameterized model is a 3D model of the object and wherein the parameters of the model are selected according to the encodings of the pose parameter values in the latent space.

Clause R The control system of clause Q wherein the pose detector fits the parameterized model to the sensor data by computing an optimization and wherein the optimization omits a prior defining how the values of the parameters change over time.

Clause S The control system of any of clauses P to R wherein the processor initiates control of a human-computer interface using the forward prediction.

Clause T The control system of any of clauses P to S wherein the relationship comprises a motion model.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A control system comprising:
   a memory storing a sequence of sensor data received from one or more sensors;
   one or more processors which process the sensor data to compute a sequence of derived sensor data values; and
   an autoencoder configured to:
     receive the sequence of derived sensor data values;
     compute a forward prediction of the sequence of derived sensor data values in latent space; and
     decode the forward prediction of the sequence of derived sensor data values in latent space to provide a forward prediction of the sequence of derived sensor data values, the autoencoder having been trained by imposing a relationship on positions of sensor data values encoded in the latent space of the autoencoder; and
   at least one of the processors being configured to initiate control of an apparatus using the forward prediction of the sequence of derived sensor data values.

2. The control system of claim 1 wherein the relationship comprises a motion model.

3. The control system of claim 1 wherein the relationship comprises a velocity.

4. The control system of claim 3 wherein the relationship comprises a constant velocity.

5. The control system of claim 1 wherein the relationship comprises an acceleration.

6. The control system of claim 1 wherein the processor uses a parameterized generative model of the derived sensor data values, and wherein the parameters of the generative model are related to parameters of the derived sensor data values when encoded in the latent space.

7. The control system of claim 6 wherein the parameters of the generative model are selected to correspond with parameters of the derived sensor data values when encoded in the latent space.

8. The control system of claim 1 wherein the autoencoder has been trained using an objective function having at least one error term defined in the latent space.

9. The control system of claim 1 wherein the autoencoder has been trained using an objective function having an error term encouraging latent variables to have identity covariance.

10. The control system of claim 1 wherein the sequence of derived sensor data values comprises at least three consecutive values x1, x2, x3, and wherein the autoencoder has been trained using an objective function which comprises an error term which is related to a motion model of the at least three consecutive values in the latent space.

11. The control system of claim 1 wherein an objective function penalizes differences between inputs to the encoder and corresponding outputs of the decoder, and where the error term which is related the a motion model is computed as a norm of the at least three consecutive values in the latent space.

12. A computer-implemented method comprising:
   receiving a sequence of derived sensor data values computed from a sequence of sensor data received from one or more sensors;
   compute a forward prediction of the sequence of derived sensor data values in latent space
   decode the forward prediction of the sequence of derived sensor data values in latent space to provide a forward prediction of the sequence of derived sensor data values, the autoencoder having been trained by imposing a relationship on positions of sensor data values encoded in the latent space of the autoencoder.

13. The method of claim 12 comprising initiating control of an apparatus using the forward prediction.

14. The method of claim 12 comprising training the autoencoder using an objective function having an error term defined in the latent space.

15. The method of claim 12 wherein the sequence of derived sensor data values comprises at least three consecutive values x1, x2, x3, and wherein the method comprises training the autoencoder using an objective function which penalizes differences between inputs to the encoder and corresponding outputs of the decoder, and which comprises an error term which is the square of double the encoding of x2 in the latent space, minus the encoding of x1 in the latent space, minus the encoding of x3 in the latent space.

16. A control system comprising:
   a memory storing a sequence of sensor data received from one or more sensors, the sensor data depicting an object;

a pose detector which processes the sensor data to compute a sequence of values of pose parameters of the object by fitting a parameterized model to the sensor data;

an autoencoder configured to:
  receive the sequence of pose parameter values;
  compute a forward prediction of the sequence of derived sensor data values in latent space; and
  decode the forward prediction of the sequence of derived sensor data values in latent space to provide a forward prediction of the sequence of pose parameter values, the autoencoder having been trained by imposing a relationship on positions of the pose parameter values encoded in the latent space of the autoencoder; and a processor configured to initiate control of an apparatus using the forward prediction of the sequence of derived sensor data values.

17. The control system of claim 16 wherein the parameterized model is a 3D model of the object and wherein the parameters of the model are selected according to the encodings of the pose parameter values in the latent space.

18. The control system of claim 16 wherein the pose detector fits the parameterized model to the sensor data by computing an optimization and wherein the optimization omits a prior defining how the values of the parameters change over time.

19. The control system of claim 16 wherein the processor initiates control of a human-computer interface using the forward prediction.

20. The control system of claim 16 wherein the relationship comprises a motion model.

\* \* \* \* \*